United States Patent [19]

Ikebe et al.

[11] Patent Number: 4,671,469
[45] Date of Patent: Jun. 9, 1987

[54] TAPE CASSETTE

[75] Inventors: Masaru Ikebe; Takateru Satoh; Kimio Tanaka, all of Nagano, Japan

[73] Assignee: TDK Corporation, Tokyo, Japan

[21] Appl. No.: 774,736

[22] Filed: Sep. 11, 1985

[30] Foreign Application Priority Data

Sep. 14, 1984 [JP] Japan .................. 59-140072[U]

[51] Int. Cl.⁴ ............... G11B 23/087; G11B 23/04; G11B 15/22; G11B 15/32
[52] U.S. Cl. ..................... 242/198; 242/197; 242/199; 242/200; 360/96.1; 360/96.5; 360/132
[58] Field of Search ............. 242/194, 197–200; 360/96.1, 96.5, 132

[56] References Cited

U.S. PATENT DOCUMENTS

| 4,021,006 | 5/1977 | Morimoto et al. | 242/199 |
| 4,470,560 | 9/1984 | Yoneya et al. | 242/198 |
| 4,472,753 | 9/1984 | Wulfing | 360/132 |
| 4,496,119 | 1/1985 | Sieben | 242/200 X |

Primary Examiner—John Petrakes
Attorney, Agent, or Firm—Steinberg & Raskin

[57] ABSTRACT

A tape cassette which is simplified in structure and operation, comprising a slider slidably mounted within a housing of the cassette to open or close a part of an opening in the housing, and being provided with mechanism for either releasing or actuating a brake against a reel within the housing of the casette, the brake acting to inhibit rotation of the reel therewithin.

14 Claims, 3 Drawing Figures

TAPE CASSETTE

BACKGROUND OF THE INVENTION

The present invention relates to a tape cassette for video or audio use, which is provided with a reel brake serving to inhibit to the rotation of the reel during non-use of the tape cassette.

The conventional tape cassette or tape cartridge, for video use for example, is provided with a lid mounted at the opening portion along the front surface of the tape cassette. During non-use of the cassette, a lid is urged by a spring to close the opening so as to cover and protect the magnetic tape mounted within the cassette. If the opening is closed by the lid, dust is prevented from entering the inner space of the cassette.

It is also possible for the lid to prevent the operator from accidentally touching the magnetic tape in handling of the cassette, so that the magnetic tape is not damaged. Furthermore, the lid serves to prevent fingerprints and oil from being impressed on the magnetic tape.

If a magnetic tape has been damaged, errors will occur in the signals therefrom. In the case of a video tape, the error in the signal causes disturbance of the reproduced picture image. In the case of an audit tape, the signal error causes interruption of the reproduced sound.

In a conventional tape cassette, the bottom plate on the front side of the tape cassette is kept partially open for insertion of the tape cassette into a driving apparatus such as a tape deck. The opening is left open even during non-use of the tape cassette. Furthermore, the conventional tape cassette is provided with a reel brake serving to prevent the reel from running idle, and thus preventing the tape from being loosened during transportation of the tape cassette, for example. The tape cassette is also provided with a mechanism for releasing the reel brake when the tape cassette is being used.

It is to be noted that only one surface of the tape can be used when a digital recording system is employed in the conventional tape cassette outlined above. It follows that, if the mechanism of the conventional tape cassette is applied in a digital tape cassette, the error occurrence caused by dust is made more prominent, leading to a greater necessity for dealing with dust or the like.

To overcome this difficulty, it has been proposed to provide a slider at the bottom of the casing or housing of the tape cassette. During non-use of the tape cassette, the slider is urged by the force of a spring so as to cover the opening made at the bottom of the tape cassette for insertion of the same into the driving apparatus. Of course, the slider is brought back to the original neutral position at which the above-mentioned opening is not covered by the slider, when the tape cassette is being used. Naturally, it is possible to prepare and operate the slider and the reel brake separately from one another. In this case however, the tape cassette is rendered complex in structure and requires troublesome operations.

SUMMARY OF THE INVENTION

Accordingly, it is an object of the present invention to provide a new and improved tape cassette.

It is also an object of the present invention to provide a tape cassette simple in structure and operation.

It is another object of the present invention to improve protection of a tape within a cassette from damage, especially when the cassette is not in use.

It is a further object of the present invention to provide a new and improved digital tape cassette.

These and other objects are provided by the present invention, which is directed to a tape cassette comprising a housing for containing at least one reel disposed therewithin for winding or unwinding of a tape thereabout, the housing being provided with an opening, brake means for engaging the at least one reel to inhibit rotation of the same, and a slider slidably mounted within the housing to open or close at least a part of the opening, said slider comprising means for actuating and releasing the brake means.

More particularly, a pair of reels is disposed within the housing of the tape cassette of the present invention, for winding/unwinding a magnetic tape therewithin. A brake is engaged with at least one of these reels, preferably both of the reels, to inhibit rotation of the same when the cassette is not in use. A slider is slidably mounted within the housing to open or close a part of the opening provided within the housing, with the slider being provided with a mechanism for operating and releasing the operation of the brake.

The present invention is also directed to a method of operating a tape cassette, which comprises the steps of simultaneously opening a portion of the cassette at least partially, and unlocking at least one reel therein for rotation, and also simultaneously closing the portion of the cassette at least partially, and locking the reel against rotation.

The mechanism for operating the brake comprises a slider body, and a spring mounted onto the slider body and having a part thereof engaged with the reel brake. It should be noted that, in the tape cassette of the present invention, the slider serves to perform both the functions of operating and releasing the reel brake, in addition to its initial function as the slider itself, for opening/closing the aforementioned-noted opening in the housing of the cassette.

BRIEF DESCRIPTION OF THE DRAWINGS

The present invention will be explained in greater detail below, with reference to a preferred embodiment of the present invention illustrated in the accompanying drawings, in which.

DESCRIPTION OF THE PREFERRED EMBODIMENTS

The accompanying drawings collectively illustrate a digital audio tape cassette according to one embodiment of the present invention.

Figure 1:
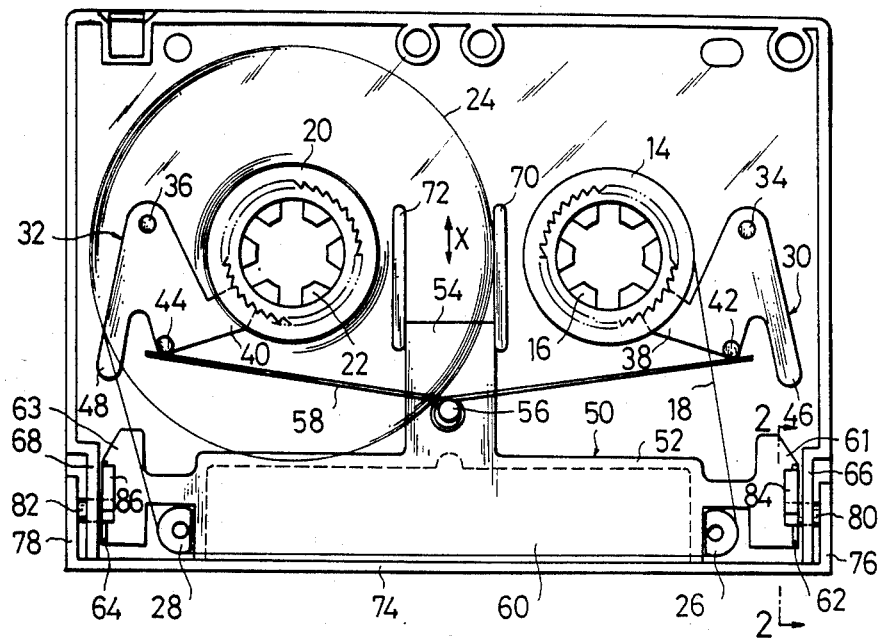
FIG. 1 is a top perspective view of a tape cassette according to one embodiment of the present invention, which is applied with respect to a digital audio tape cassette, the internal structure during non-use thereof being schematically illustrated in the figure.
Figure 2:
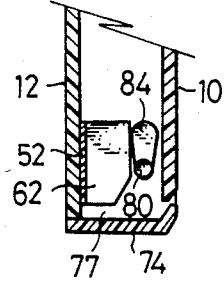
FIG. 2 is a cross-sectional view along line 2—2 of FIG. 1.
Figure 3:
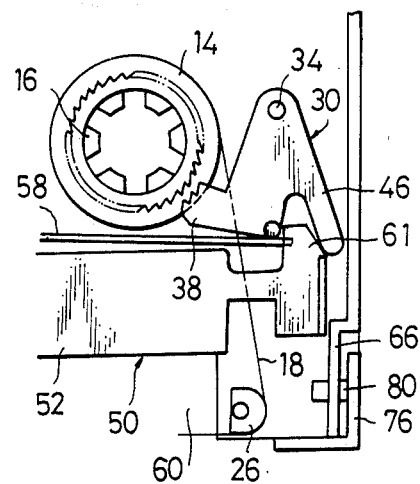
FIG. 3 is a top perspective view schematically illustrating the internal structure of the tape cassette during operation thereof.

In the present invention, the housing of the tape cassette has an upper half 10 and a lower half 12, as illustrated in FIG. 2. Each of these upper and lower halves is formed of plastic material. The overall structure of the tape cassette is illustrated in FIG. 1.

More specifically, a magnetic tape 18 of a digital recording type is wound about a reel hub 16 of a supplying side reel 14. The tape 18 wound about the supplying side reel 14 is run so as to be wound about a reel hub 22 of a take-up-side reel 20. When the tape 18 has been completely wound about the take-up reel 20, then the outermost turn of the tape 18 forms a circle 24. During operation of the tape cassette, the tape 18 is guided from the supplying side reel 14 to the take-up side reel 20, by tape guides 26 and 28.

The tape cassette comprises reel brakes including a brake lever 30 constituting the reel brake body of the supplying side reel 14, and another brake lever 32 constituting the reel brake body of the take-up side reel 20. These brake levers 30, 32 are rotatably supported by fulcrums 34 and 36 respectively. Also, these brake levers 30, 32 are provided with stoppers 38, 40 engaged with the reel hubs 16 and 22 as illustrated in FIG. 1. As illustrated in this figure, the edges of at least a portion of the respective hubs 16 and 22, and of the stoppers 38 and 40, are serrated, so that the stoppers 38 and 40 along with the respective hubs 16 and 22, will meshingly engage one another. The brake levers 30 and 32 are also provided with respective protrusions 42 and 44 for bracing a spring 58, in addition to being provided with projections 46 and 48 which are each adapted to engage respective end portions of a slider 50, which is described below.

As described further below, the force for actuating each of the above-described reel brakes is applied to each of the protrusions 42 and 44, while the force for releasing the reel brakes is supplied to each of the projections 46 and 48. As a result, the reel brakes are actuated during non-use of the tape cassette, so as to prevent the reels 14 and 20 from running idle. When the tape cassette is used, the reel brakes are released so as to permit rotation of the reels 14 and 20.

The slider 50 comprises a substantially oblong base 52 and a guide plate 54 extending from the central portion of the base 52 towards the center of the housing. A protrusion 56 for supporting the spring 58 is formed in the central portion of the guide plate 54. As viewed in FIG. 1, the central portion of the spring 58 is wound about the protrusion 56. Both ends of the spring 58 abut against the spring-bracing protrusions 42 and 44 of the brake levers. Thus, the spring 58 also serves to actuate the reel brakes.

During non-use of the tape cassette, both ends of the spring 58 upwardly push the protrusions 42 and 44 serving to brace the spring 58, with the result that the brake levers 30 and 32 are swung about the respective fulcrums 34 and 36, towards the respective reels 14 and 20. In this state, the teeth formed at the tips of the stoppers 38 and 40 engage the teeth formed at the outer peripheries of the respective reel hubs 16 and 22, so as to enable the brakes 30 and 32 to perform their respective braking functions. At the same time, the biasing force of the spring 58 is transmitted via the protrusion 56 for supporting the spring 58, to the slider 50 so as to move the slider 50 towards the periphery of the housing.

The slider 50 concomitantly closes an opening formed in the bottom portion of the housing during non-use of the tape cassette. The opening 60, denoted by a dotted line in FIG. 1, permits the tape cassette to be inserted into a driving apparatus when the tape cassette is to be used.

If the tape cassette is set in the driving apparatus for the operation thereof, then the slider 50 is pushed towards the reels 14 and 20 by a pin (not illustrated) for pushing the slider 50. Immediately before completion of the movement of the slider 50, inclined portions 61 and 63 formed at both side ends portions of the slider 50, abut against the inner surface of the projections 46 and 48 of the respective brakes levers 30 and 32, so as to outwardly push the projections 46 and 48.

As a result, the brake levers 30 and 32 are swung about the respective fulcrums 34 and 36, away from the respective reels 14 and 20. The stoppers 38 and 40 are concomitantly disengaged from the respective reel hubs 16 and 22, so as to release the reel brakes. The reels 14 and 20 are naturally permitted to rotate. In this state, the opening 60 for insertion of the tape cassette into the driving apparatus, is completely opened so as to provide a space for insertion of a pin for imparting load to the tape, for example.

The tape cassette also comprises upright plates 62 and 64 extending from both side portions of the body 52 of the slider 50, and positioned near respective portions 66 and 68 of the right and left side walls of the housing of the tape cassette. Furthermore, a pair of stationary guide members 70 and 72 which are parallel with each other project from the half 12 of the housing. The side surfaces of the guide plate 54 of the slider 50 are brought into contact with the inner surfaces of the stationary guide members 70 and 72, as illustrated in FIG. 1. In this manner, the slider 50 is guided in the direction denoted by an arrow x in FIG. 1 by the stationary guide members 70 and 72 and the inner surfaces of the portions 66 and 68 of the side walls of the housing.

Reference numeral 74 denotes a lid having a substantially L-shaped cross section. The lid 74, which serves to protect the tape, comprises side walls 76 and 78. An opening 77 in the front surface of the tape cassette is opened or closed by the lid 74. Furthermore, rotary shafts 80 and 82 are mounted on the respective side walls 76 or 78 of the lid 74. The lid 74 is rotatably pivoted by the rotary shafts 80 and 82 with respect to the portion 66 and 68 of the side walls of the housing. During non-use of the tape cassette, the lid 74 is urged by a spring (not illustrated) so as to close the front surface of the housing. However, when the tape cassette in set in the driving apparatus for the operation thereof, a pin (not illustrated) pushes the lid 74 against the biasing force of the spring, so as to rotate the lid by 90° about the rotary shafts 80 and 82. As a result, the front surface of the tape cassette is opened so as to expose the tape 18 to the outside.

The rotary shafts 80 and 82 of the lid are provided at the tip portions with respect to cam-like projections 84 and 86. These projections 84 and 86 and the upright plate 62 and 64 of the slider 50, together form a mechanism for making the lid 74 stationary. More specifically, the cam-like projections 84 and 86 of the lid 74 abut against the upper surfaces of the upright plates 62 and 64 of the slider during non-use of the tape cassette, with the result that the lid 74 is locked against rotation. When the tape cassette is set in the driving apparatus for operation thereof, the slider 50 is moved backwardly by a pushing pin (not illustrated) of the slider. In this case, the cam-like projections 84 and 86 are disengaged from the respective upright plates 62 and 64 of the slider 50, so as to allow the lid 74 to rotate.

In the embodiment described above, the technical concept of the present invention is applied to a digital audio tape cassette. However, the technical concept of the present invention can also be applied to a digital video tape cassette, quite feasibly.

As described above in detail, the slider also performs the function of operating a reel brake and releasing the reel brake in the present invention, making it possible to operate the reel brake and release the operation thereof in accordance with the sliding motion of the slider. The particular structure permits simplifying the structure of the tape cassette, and facilitates the tape cassette operation.

Obviously, numerous modifications and variations of the present invention are possible in light of the above teachings. It is therefore to be understood that the invention may be practiced otherwise and as specifically disclosed herein.

What is claimed is:

1. A tape cassette, comprising
a housing for containing a pair of reels disposed within said housing, one of the reels for winding a tape thereabout, and the other of the reels for unwinding the tape thereabout, said housing provided with a first opening in a bottom of said housing,
brake means for engaging the reels to inhibit rotation of the same,
a slider slidably mounted within said housing to open or close at least a part of said first opening, said slider comprising means for actuating and releasing said brake means, and
a lid pivotally mounted onto said housing, said lid adapted to at least partially open or close a second opening in a front of said housing,
wherein said actuating/releasing means comprise spring means mounted on said slider and at least partially engaged with said brake means,
said brake means comprise a pair of brake members, each pivotally mounted within said housing, each of said brake members having a contact portion adapted to engage a respective one of the reels, and a projection, and
said actuating/releasing means comprise said slider having two pusher members formed at sides thereof, said respective pusher members disposed to engage respective brake member projections and pivot said respective brake members to disengage said respective contact portions from the reels, whereby the reels are free to rotate, and
said respective pusher members disposed to be disengaged from said respective brake member projections and allow the same to be pivoted by said spring means, whereby said contact portions engage the reels to inhibit rotation of the same.

2. The cassette of claim 1, wherein said slider comprises a projection, a substantially central portion of said spring means being wound about said projection.

3. The cassette of claim 2, wherein said spring means bias said brake members to engage said respective reels and bias said slider to close at least part of said first opening and disengage said pusher members from said respective brake member projections.

4. The cassette of claim 3, wherein each brake member comprises a protrusion, with said spring means contacting said respective brake member protrusion.

5. The cassette of claim 2, wherein said slider comprises a substantially oblong base and a guide plate, with said slider projection extending from a substantially central portion of said guide plate.

6. The cassette of claim 5, wherein said pusher members are formed as projections extending from sides of said slider base, each said pusher member having a side which is slanted with respect to a direction of movement of said slider.

7. The cassette of claim 5, additionally comprising a pair of stationary, substantially parallel guide members mounted upon said cassette housing, said guide members contacting sides of said slider glide plate and forming a channel for guiding movement of said slider guide plate.

8. The tape cassette of claim 1, wherein a hub is disposed on each reel, said respective brake member adapted to engage the respective hub.

9. The tape cassette of claim 1, wherein each of the reels comprises a serrated hub, and said contact portions of said brake members are also serrated, whereby said contact portions are adapted to meshingly engage the respective hubs.

10. The cassette of claim 1, additionally comprising shaft means mounted on said housing, said lid pivotally mounted on said shaft means, and
at least one cam-like projection mounted on said shaft means, said slider adapted to abut against said cam-like projection to lock said lid against rotation when the tape cassette is not in use.

11. The cassette of claim 10, wherein said shaft means comprise
a pair of rotary shafts, each said shaft being mounted upon a respective side wall of said lid and rotatably mounted upon a respective side wall of said cassette housing,
a pair of cam-like projections, each being mounted upon a respective rotary shaft,
said slider pusher members each comprising a substantially upright plate with respect to a direction of movement of said slider, an upper surface of each said upright plate adapted to abut against said respective cam-like projection to lock said lid against rotation in a closed position, when the tape cassette is not in use, and
said cam-like projections being disengaged from the upper surfaces of said upright pusher member plates when said slider is moved to a retracted position, allowing said lid to rotate and exposing the tape through said second opening.

12. The cassette of claim 1, wherein each said pusher member is slanted with respect to a direction of movement of said slider.

13. The cassette of claim 1, additionally comprising two fulcrums situated upon said cassette housing, with each said brake member being pivotally mounted upon a respective fulcrum.

14. A tape cassette, comprising
a housing containing a pair of reels therewithin, one of the reels situated for winding a tape thereabout and the other of said reels situated for unwinding the tape thereabout,
said housing comprising two openings, a first opening in a bottom surface thereof and a second opening in a front surface thereof for exposing the tape running between the two reels,
a slider slidably mounted within said housing to open or close at least a part of said first opening, said slider comprising an elongated base, a guide plate extending from said elongated base, a pair of pusher members extending from opposite sides of said elongated base, each said pusher member having a face which is slanted with respect to a direction of movement of said slider, and a projection extending from said guide plate, a pair of substantially parallel guide members mounted on said cassette housing and defining a channel for guiding movement of said guide plate, a lid pivotally mounted upon said housing for at least partially opening or closing said second opening, a pair of shafts, each mounted upon a respective side wall of said lid and pivotally mounted upon a respective side wall of said cassette housing, a pair of cam-like projections each mounted upon a respective shaft, said slider pusher members each comprising a plate substantially upright with respect to the direction of movement thereof, each said plate adapted to abut against said respective cam-like projection to prevent rotation of said lid when the tape cassette is not in use, and said cam-like projections being disengaged from said respective upright plates when the tape cassette is put into use, allowing rotation of said lid and exposing of the tape in said second opening, a pair of brake members, each in the form of a lever pivotally mounted on a fulcrum situated upon said cassette housing, and having a serrated stopper member for meshingly engaging a serrated hub of a respective reel to prevent rotation of the same, a protrusion, and a projection adapted to be engaged by said slanted face of said respective slider pushing member, a spring wound about said projection extending from said guide plate and contacting said respective brake member protrusion, said spring biasing said brake levers to pivot about said respective fulcrum and engage said respective reel hubs to prevent rotation of the same, and biasing said slider to close at least part of said first opening and disengage said pusher member slanted faces from said brake member projections when the cassette is not in use, and said slider pusher member slanted faces being disposed to contact said respective brake member projections and pivot said brake members in opposition to said spring to release engagement of said stopper members on the reel hubs and allow the reels to rotate, when said slider is moved to a retracted position as the tape cassette is put into use.

* * * * *